United States Patent [19]

Inagaki et al.

[11] Patent Number: 4,468,979
[45] Date of Patent: Sep. 4, 1984

[54] BREATHER VENTILATION SYSTEM OF POWER-TRANSMISSION CASING FOR USE IN MOTORCYCLE

[75] Inventors: Takashi Inagaki; Goroei Wakatsuki; Shigeo Kimura, all of Saitama, Japan

[73] Assignee: Honda Giken Kogyo Kabushiki Kaisha, Tokyo, Japan

[21] Appl. No.: 262,247

[22] Filed: May 11, 1981

[30] Foreign Application Priority Data

Jul. 25, 1980 [JP] Japan ............................ 55/104575[U]

[51] Int. Cl.³ ............................................. F16H 57/02
[52] U.S. Cl. .................................................. 74/606 R
[58] Field of Search ........................... 74/606 R, 606 A

[56] References Cited

U.S. PATENT DOCUMENTS

| | | | |
|---|---|---|---|
| 1,130,491 | 3/1915 | Delaunay-Belleville | 74/606 R |
| 1,144,331 | 6/1915 | Lower | 74/606 R |
| 1,297,755 | 3/1919 | Vincent | 74/606 R |
| 1,974,803 | 9/1934 | Chilton | 74/606 R |
| 1,974,804 | 9/1934 | Chilton | 74/606 R |
| 2,325,647 | 8/1943 | Adamson | 74/606 A |
| 2,989,995 | 6/1961 | Happe | 74/606 X |
| 4,098,143 | 7/1978 | Kubo et al. | 74/606 R |

Primary Examiner—Kenneth Dorner
Assistant Examiner—Anthony W. Raskob, Jr.
Attorney, Agent, or Firm—Sughrue, Mion, Zinn, Macpeak and Seas

[57] ABSTRACT

A breather passage is provided to perform breathing function for both two casings, one being a first casing housing therein a power-transmission means and the other being a second casing housing therein a gear-transmission mechanism. The breather passage is defined between interfacing surfaces of a main body and a cover those providing the second casing. A gasket is interposed between the main body and the cover so as to devide the breather passage into two passages. The breather passage has one end formed with a first breather hole opened to an atmosphere and the other end formed with a second breather hole opened to an interior of said second casing. The breather passage is further formed with a branch passage at the position rearward from said second breather hole to permit liquid communication between an interior of the first casing and the atmosphere.

9 Claims, 5 Drawing Figures

BREATHER VENTILATION SYSTEM OF POWER-TRANSMISSION CASING FOR USE IN MOTORCYCLE

BACKGROUND OF THE INVENTION

This invention relates to a breather provided in a power-transmission casing for use in a motorcycle.

As is well known, a power-transmission casing is mounted to a body of a motorcycle in parallelism thereto. The casing is extended at a position between an engine and a rear wheel in order to cover a gear transmission mechanism coupled to the rear wheel and a power transmission means such as V-belt trained over an engine output shaft and the gear transmission mechanism. According to a conventional power transmission casing, a breather passage is integrally formed at an outer peripheral portion thereof so as to provide gas communication between inside and outside of the casing. The breather passage has one outer end formed with a breather hole opened to an atmosphere. Therefore, there has been drawbacks in that water may enter the casing through the breather passage. For example, in washing or cleaning of the motorcycle, if water is present at the breather hole, the water may be drawn into the casing due to the negative pressure created in the casing. The negative pressure is generated due to the immediate cooling of the casing in washing the same with water. Such sucked water is mixed with oil accumulated in the casing for lubrication of gear-transmission mechanism, thereby degrading the lubricating of the oil Further, there has been demanded to commonly use the breather passage for gas communication of the two power transmission casings, one being the casing for gear-transmission mechanism, and the other being the casing for power transmission means.

In another type of the breather system, only single breather hole is formed at the bottom portion of the casing extending in the vertical direction. In such case, when the motorcycle runs through a puddle or stream, water may enter the casing and contact the power transmission means.

SUMMARY OF THE INVENTION

It is therefore, an object of the invention to overcome the above-mentioned drawbacks and to provide an improved breather system for a power transmission casing for use in a motorcycle.

Another object of the invention is to provide such a breather system capable of co-using a breather passage for a first power transmission casing adapted to accommodate a power transmission means and a second power transmission casing adapted to accommodate a gear transmission mechanism coupled to a rear wheel, the former casing being referred to as a dry chamber, and the latter as a wet chamber.

Still another object of the invention is to provide such a breather system capable of commonly using a breather passage for the first and second casings, yet preventing water from being leaked into the second chamber.

Still another object of the invention is to provide such a breather system capable of avoiding water or oil stagnation within the breather passage.

Still another object of the invention is to provide such a breather system of the type wherein the breather passage has one upper end opened to the atmosphere while a lower breather hole is formed to discharge water therethrough, in which the water directed to the lower breather hole does not contact the power transmission means.

Still another object of this invention is to provide such a breather system capable of preventing water from enter the first casing through a lower breather hole.

These and other objects of this invention are attained in accordance with the present invention by providing a first power transmission casing which accommodates therein a power transmission means and a second power transmission casing which accommodates therein a gear-transmission mechanism. The second casing is referred to as a wet chamber in which are disposed an input shaft driven by an engine through the power transmission means, an output shaft coupled to a rear wheel and idle gears positioned between the input and output gears. According to one of the features of the present invention, the idle gears are disposed at a position lower than the input and output gears and are deeply dipped into oil in an oil accumulation chamber defined at the lower portion of the second casing. With this structure, a relatively large space is presented above the idle gears. At the position above the idle gears, a breather hole is formed in a partition wall. The breather hole is formed at a „sition frontwardly and laterally offset from the rotational axis of the idle gears.

The second casing fixedly secures the first casing at its one side. The first casing is referred to as a dry chamber. The second casing is defined by a main body and a cover each coupled together interposing therebetween a gasket. The confronting planar end surfaces of the main body and the cover are formed with recesses so as to provide a breather passage upon coupling therebetween. The breather passage has one outer end formed with first breather holes opened to the atmosphere, and has the other end formed with the second breather hole opened to the wet chamber as mentioned above. The breather passage extending parallel to the travelling direction of the motorcycle and has a top portion at its longitudinal center. The breather passage is further formed with a branch passage at an upstream side of the second breather hole in order to cause water introduced into the breather passage to flow into the first casing. Since the first casing provides a relatively larger interior volume than that of the second casing, the water is easily introduced into the first casing because of the negative pressure differential therebetween upon cooling of these casings. Therefore, water introduction into the second casing (wet chamber) can be prevented, to thus prevent oil in the oil accummulation chamber from mixing with water.

The power transmission casing also provides upper and lower breather holes adapted to discharge water introduced into the first casing from the lower breather hole. The gasket interposed between the main body and the cover of the second casing divides the breather passage into two passages. The gasket is in sealing contact with one side surface of the second breather hole, to thereby prevent water from being introduced into the second casing (wet chamber). The gasket is provided with a vertically extended portion extending away from the wet chamber. At the water path defined between the upper and the lower breather holes, the extended portion of the gasket serves to guide water within the first casing, so that water contact with the power transmission means is prevented. The lower breather hole is oriented toward the rearward direction of the motorcycle, and at the position immediately frontward of the lower breather hole, a rib extends downwardly from the casing to push aside water during running of the motorcycle through a puddle or pool.

The features which are believed to be novel and characteristic of this invention are set forth in particular in the appended claims. The invention itself, however, both as to its organization and mode of operation, together with the additional objects and advantages thereof will become apparent in the course of the following description which is to be read in connection with the accompanying drawings in which like parts and components are designated by the same reference numerals and characters throughout.

DETAILED DESCRIPTION OF THE INVENTION

Figure 1:
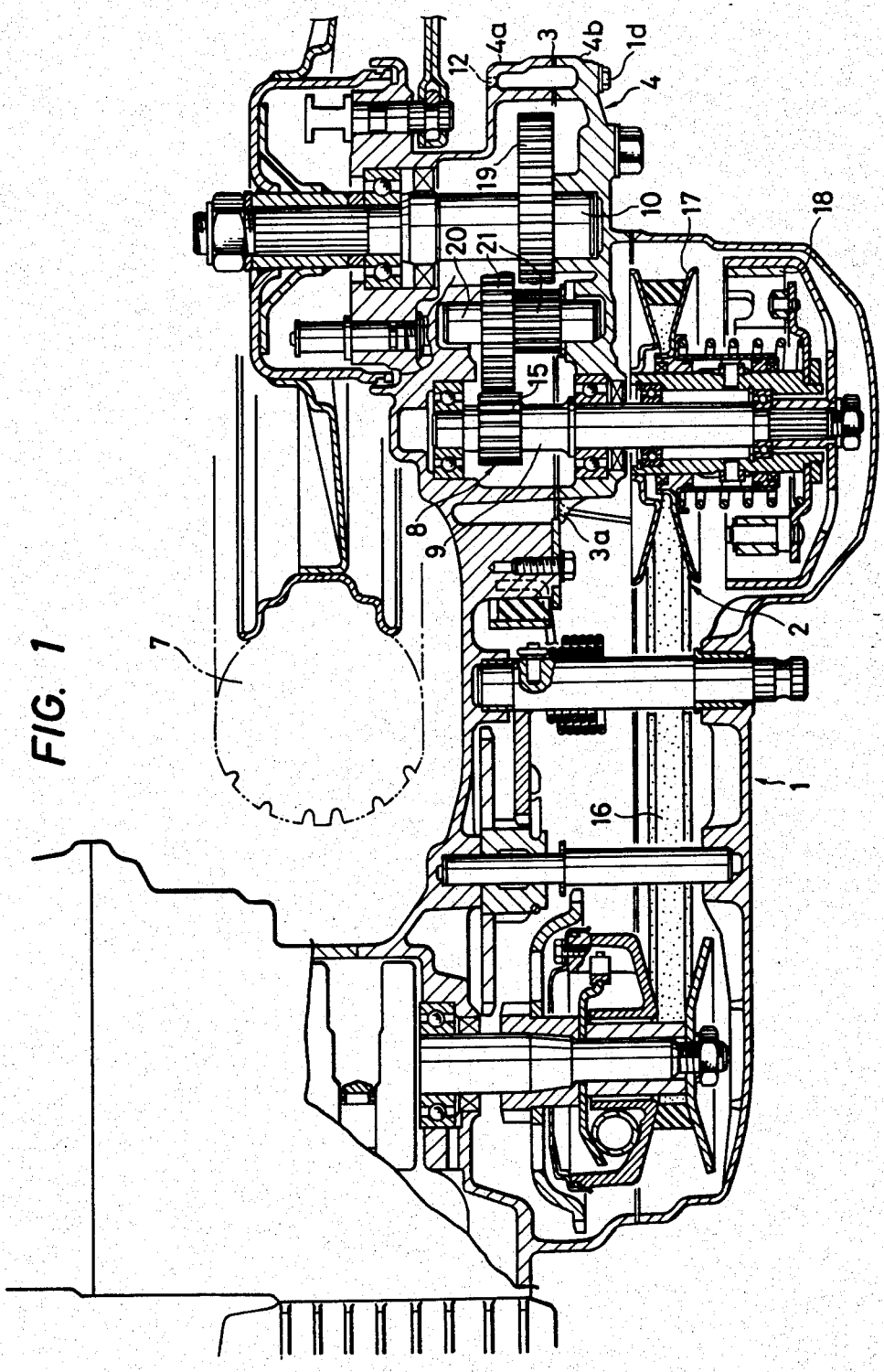
FIG. 1 is a cross-sectional view taken in the horizontal direction of a power-transmission casing according to the present invention, in which a first casing and a second casing are coupled together.

Referring now to the drawings, and initially to FIG. 1, a first power transmission casing 1 is coupled to a second power transmission casing 4, and these extend generally in the longitudinal direction of the body of a motorcycle and are mounted at a position between its engine and a rear wheel 7, to thereby provide a swingunit. The first transmission casing 1 accommodates therein a power transmission means 2, and the second transmission casing 4 houses a gear transmission mechanism 8. The second casing 4 also houses an input shaft 9 extending perpendicular to the longitudinal direction of the body of the motorcycle which is used to connect the engine is the power transmission means 2, and an output shaft 10 extending parallel to the input shaft 9 and used to supply power to the rear wheel 7. The input shaft 9 is positioned in front of the output shaft 10. The input shaft 9 is provided with an input gear 15. The output of the engine is transmitted to the input shaft 9 through a V-belt 16 of the power transmission means 2, a V-pulley 17 and a centrifugal clutch 18. The rotation of the input gear 15 is transmitted to the output shaft 10 through an idler gear 21 mounted on an intermediate shaft 20 and an output gear 19 mounted on the output shaft 10 to thereby rotate the rear wheel 7.

Figure 2:
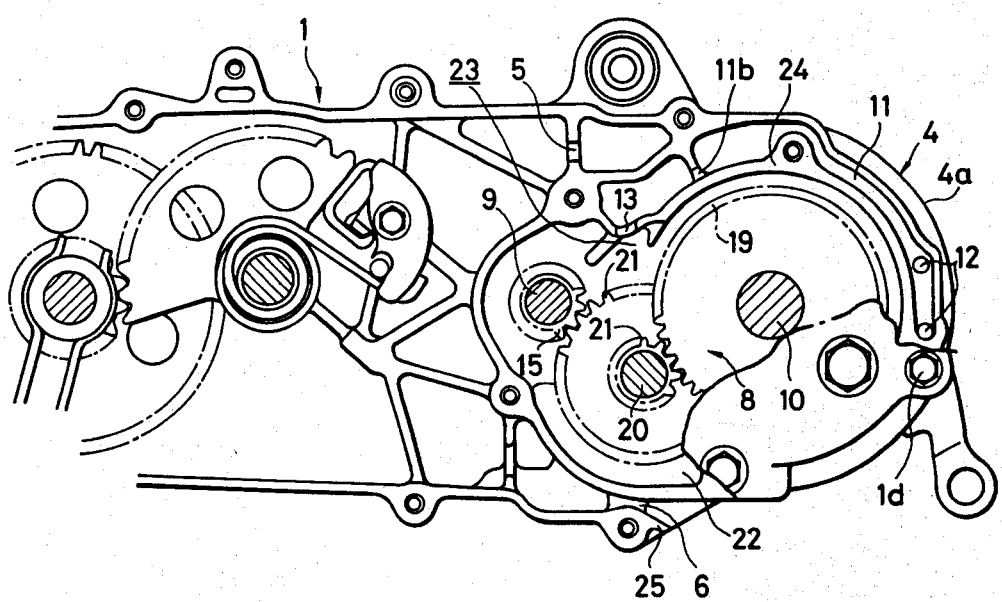
FIG. 2 is a partial side view of a main body of the second casing which accommodates a gear-transmission mechanism therein according to the present invention.

The second casing 4 is defined by a main body 4a of the casing and a case cover 4b coupled thereto, and provides at its bottom an oil accumulation chamber 22 (FIG. 2), to thus perform as a wet chamber. On the other hand, the first casing 1 does not provide therein such oil accumulation chamber so as to perform as a dry chamber having a relatively large inner volume. At an interfacing portion between the main body 4a of the casing and the case cover 4b, a breather passage 11 is formed along travelling direction of the motorcycle as shown in FIG. 2. The breather passage 11 has its rear end formed with a breather holes 12 opened to the atmosphere and a front end formed with a second breather hole 13 adapted to provide fluid communication between an interior of the second casing 4 and the atmosphere. Further, the breather passage 11 is formed with a branch passage 11a positioned upstream side of the second breather hole 13 so as to provide fluid communication between the interior of the first casing 1 and the atmosphere.

The breather passage 11 is provided at the interfacing walls of the main body 4a of the casing and the case cover 4b by forming recesses along travelling direction of the motorcycle. Between the main body 4a and the case cover 4b, a gasket 3 is sealingly interposed. The cover 4b is secured to the main body of the casing 4a by means of a bolt 1d. The gasket 3 divides the breather passage 11 into two sub-passages 11' and 11''. One of the sub-passages 11' communicates the interior of the second casing 4 while the other passage 11'' communicates the interior of the first casing 1. Such fluid communication is schematically shown in FIG. 4 and is explained later in detail.

Figure 3:
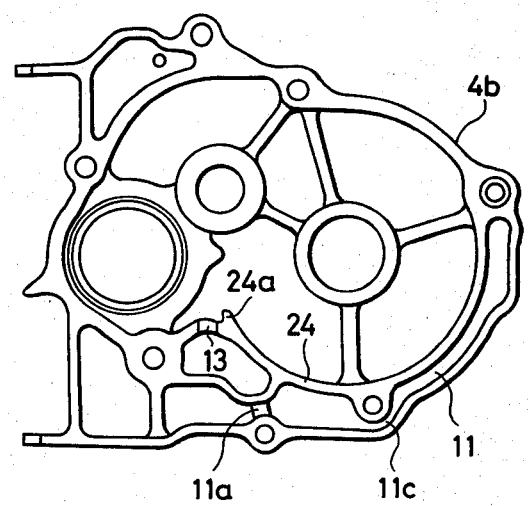
FIG. 3 is a partial side view of a cover of the second casing to be coupled to the main body.

The shape of the breather passage 11 is shown in FIGS. 2 and 3, wherein the passage 11 has a highest level at its longitudinally center portion. At the longitudinal center, a narrowed path 11c is provided if desired.

As shown in FIG. 2, the idler gears 21 in meshing engagement with the input and output gears 15, 19 are positioned lower than the positions of the input and output gears, to thereby provide a relatively large space 23 at the position above the idler gears 21. Further, an upper partition wall 24 is provided above the space 23. The partition wall 24 is penetrated by the second breather hole 13 mentioned above. The second breather hole 13 is formed at the position frontwardly and laterally offset from the idle gears 21. At the position immediately rearward from the second breather hole 13, a rib 24a is extended from the partition wall 24. The rib 24a functions to prevent an oil scattered from the output gear 19 from entering the second breather hole 13.

Figure 4:
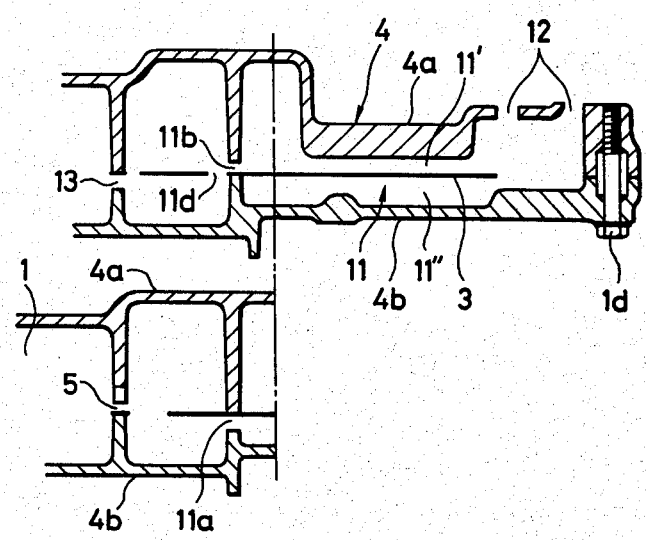
FIG. 4 is an explanatory illustration showing a breather passage according to the present invention.

According to FIG. 4, the breather passage 11 is in fluid communication with the interior of the second casing 4 through the second breather hole 13 and with the interior of the first casing 1 through the branch passage 11a to perform breathing function. That is, the breather passage 11 is commonly used for breathing function of both first and second casings 1 and 4. In this case, if the motorcycle is washed, or run through a puddle or stream, the casing is subject to cooling to generate negative pressure within the casing. Therefore, water may be sucked into the breather passage 11 through the first breather holes 12. However, according to the breather system of the present invention, because the first casing has a relatively large inner volume, and water is merely introduced into the first casing 1 through the branch passage 11a, so that the second casing (wet chamber 4) is not subject to water introduction. Such water path is established by the relationship between the gasket 3 and the breather hole 13 and the branch passage 11a as schematically shown in FIG. 4. More specifically, the gasket 3 seals the second breather hole 13 while it allows fluid communication with the first casing via the branch passage 11a. (The gas communication between the casing 4 and the atmosphere can be achieved through a perforation 11d formed in the gasket.) Further, since the first casing has a relatively larger internal volume than that of the second casing, a higher negative pressure is generated in the first casing than that in the second casing upon cooling. Therefore, the water introduced into the breather passage 11 is subject to sucking into the first casing rather than into the second casing.

Figure 5:
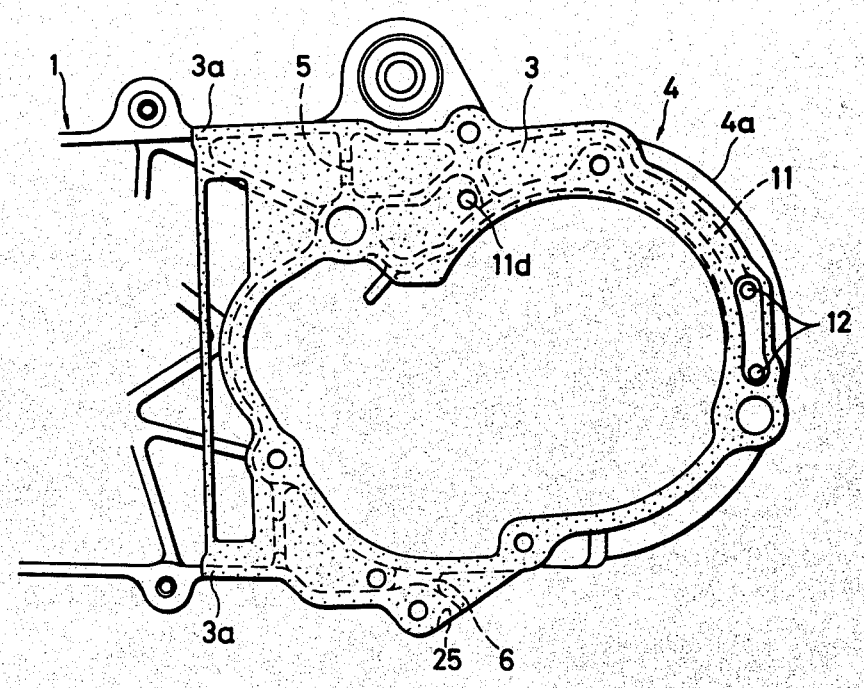
FIG. 5 is a side view of a gasket interposed between the main body and cover of the second casing specifically showing a water leading portion extended forwardly from the second chamber.

FIG. 5 shows a shape of the gasket 3 employed in the present invention. The gasket 3 provides an extended portion 3a vertically extended and positioned frontward from the second wet chamber 4. That is, in case water enters the breather passage 11 through the first breather holes 12, the water is introduced toward an upper portion of the first casing through the branch passage 11a and a third breather hole 5. Then the water flows downwardly and is discharged from the casing 1 through a fourth breather hole 6 positioned at the bottom of the first casing 1. In ths case, at the water path between the third and fourth breather holes 5 and 6, the extended portion 3a of the gasket 3 leads the water at its one side wall, so that the wetting of the power transmission means 2 can be avoided.

The fourth breather hole 6 is oriented rearwardly of a motorcycle, and at the position immediately frontward of the hole 6, a rib 25 extends downwardly from the bottom of the casing 1. The fourth breather hole 6 is in fluid communication with the atmosphere to perform water discharge therethrough, as achieved in the conventional system. However, according to the present invention, when the motorcycle runs through a puddle, the rib 25 urges the water downwardly during running of the motorcycle, so that the water is displaced downwardly, whereby the rib 25 prevents water from entering the first casing through the fourth breather hole 6. In other words, water entrance into the casing 1 is avoided to some extent by the provision of the rib 25.

The effect and advantages attendant to the present invention will be described.

(a) Since the breather passage 11 is in fluid communication with the first casing 1 through the branch passage 11a as well as with the second casing 4 through the second breather hole 13, the passage 11 can be commonly used for the breathing function of both first and second casings. As a result, a simplified construction results. Further, in case the first casing 1 is constructed with a relatively large inner volume to provide a dry chamber and the second casing 4 is constructed with a relatively small inner volume to provide a wet chamber, water entering the breather passage 11 during running of the motorcycle through a puddle is not introduced into the wet chamber but merely introduced into the dry chamber because of the internal pressure differential therebetween, whereby oil-water mixing is prevented in the wet chamber.

(b) Since the breather passage 11 has the highest level at the longitudinally center portion thereof, water or oil entering therein through the first or second breather holes 12 or 13 does not reach the highest portion and a back-flow occurs, because of gravity, so that oil or water retention within the breather passage 11 can be prevented.

(c) Since the idler gears 21 are positioned below the input and output gears 15 and 19, these input and output gears can be positioned closely with each other, to thus reduce the overall longitudinal length of the casing. Further, because of this positional relationship, the idler gears 21 can be deeply dipped into the oil in the oil accumulation chamber to perform a sufficient oil scattering function. Furthermore, because of such a positional relationship between the idler gears and the input and output gears, a relatively large volume of space 23 can be presented above the idle gears 21, so that there is a lesser probability that the scattered oil will reach the second breather hole 13 because of the long distance thereto. In this case, since the breather hole 13 is is positioned offset from the idler gears 21 frontward of the motorcycle, the probability of the oil entering the second breather hole 13 is minimized.

(d) Since water introduced into the breather passage 11 through the first breather holes 12 is discharged through the fourth breather hole 6 via the vertically extended portion 3a of the gasket 3, the power transmission system is not subject to wetting due to water entering the first casing.

(e) Since the fourth breather hole 6 is oriented rearwardly and since the rib 25 extends downwardly from the first casing at a position immediately frontward of the hole 6, water entry into the first casing through the hole 6 is eliminated to some extent during running of the motorcycle through a puddle or stream. The rib 25 directs such water downwardly to provide an air space between the water surface and the hole 6.

While the invention has been described in detail and with reference to specific embodiments thereof, it will be apparent to one skilled in the art that various changes and modificiations can be made therein without departing from the spirit and scope of the invention.

What is claimed is:

1. In a power transmission housing for a motorcycle, including a first casing accommodating therein a power transmission mechanism and a second casing accommodating therein a gear transmission mechanism and having an oil accumulation chamber at a bottom portion thereof, said first casing having a larger volume than said second casing, the improvement wherein said second casing comprises a main body and a cover coupled together, interfacing portions of said main body and said cover defining a main breather passage and a branch breather passage, said main breather passage having a first breather hole opening to the atmosphere at a position to the center rear of said second casing and having a top portion at a longitudinally center portion of said second casing, said main breather passage extending arcuately upwardly from said first breather hole to said top portion, said main breather passage extending from said top portion through a second breather hole opening to the interior of said second casing, and said branch passage extending forwardly of said main passage and through a third breather hole into the interior of said first casing, said first casing including a lower breather hole venting said first casing to atmosphere and acting as a water exit for any water which may enter therein via said first breather hole.

2. The power transmission housing as defined in claim 1, wherein said main breather passage generally extends along a moving direction of said motorcycle.

3. The power transmission housing as defined in claim 2, wherein said main breather passage is formed with a narrow path at the longitudinal center portion thereof.

4. The power transmission housing as defined in claim 1, wherein said gear-transmission mechanism comrises an input gear, intermediate gears and an output gear, said input gear being connected to an engine through said power transmission means and said output gear being coupled to a rear wheel of said motorcycle, said intermediate gears being disposed at a position lower than that of said input and output gears, to thereby provide a space having a relatively large volume above said intermediate gears.

5. The power transmission housing as defined in claim 4, wherein said second breather hole opens above said intermediate gears and is formed at a position frontwardly and sidewardly offset from a rotational axis of said intermediate gears.

6. The power transmission housing as defined in claim 1 or 4, further comprising a first rib extending downwardly and positioned immediately adjacent to said second breather hole.

7. The power transmission housing as defined in claim 1, wherein an upper breather hole is provided frontwardly of said branch passage to provide fluid communication between said main breather passage and the interior of said first case.

8. The improvement as defined in claim 7, further comprising a gasket interposed between said main body and said cover, said gasket being provided with an extended portion at a position frontward of said second casing, and extending vertically from said upper breather hole to said lower breather hole.

9. The improvement as defined in claim 7, wherein said lower breather hole is rearwardly oriented, and further comprising a second rib extending downwardly and positioned immediately frontward of said lower breather hole.

* * * * *